United States Patent
Shim et al.

(10) Patent No.: US 9,454,223 B2
(45) Date of Patent: *Sep. 27, 2016

(54) APPARATUS AND METHOD FOR CONTROLLING PORTABLE TERMINAL

(75) Inventors: Jung-hyun Shim, Seongnam-si (KR); Kee-eung Kim, Seoul (KR); Hyun-jin Kim, Gwangju (KR); Joon-ah Park, Seoul (KR); Ho-yeal Lee, Yongin-si (KR); Hyun-jeong Lee, Yongin-si (KR); Wook Chang, Seoul (KR); Seung-nyang Chung, Seoul (KR); Sung-jung Cho, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,196

(22) Filed: Dec. 15, 2011

(65) Prior Publication Data

US 2012/0088489 A1  Apr. 12, 2012

Related U.S. Application Data

(63) Continuation of application No. 11/268,449, filed on Nov. 8, 2005, now Pat. No. 8,103,263.

(30) Foreign Application Priority Data

Nov. 19, 2004 (KR) .................. 10-2004-0095293

(51) Int. Cl.
 *H04M 3/00* (2006.01)
 *G06F 3/01* (2006.01)
 (Continued)

(52) U.S. Cl.
 CPC ............ *G06F 3/011* (2013.01); *G06F 1/1626* (2013.01); *G06F 1/1684* (2013.01); *G06F 1/1686* (2013.01); *G06F 1/1694* (2013.01); *H04M1/72519* (2013.01); *H04M 1/72563* (2013.01); *H04M 1/72583* (2013.01); *H04M 1/72547* (2013.01); *H04M 1/72558* (2013.01); *H04M 1/72569* (2013.01); *H04M 2250/12* (2013.01)

(58) Field of Classification Search
 None
 See application file for complete search history.

(56) References Cited

U.S. PATENT DOCUMENTS 4,242,676 A  12/1980 Piguet et al.
6,232,957 B1  5/2001 Hinckley
(Continued)

FOREIGN PATENT DOCUMENTS

JP  2004-23317  1/2004
JP  2004-177993  6/2004
(Continued)

OTHER PUBLICATIONS

Machine translation of JP2004-302734 A.*
(Continued)

*Primary Examiner* — German J Viana Di Prisco
(74) *Attorney, Agent, or Firm* — Staas & Halsey LLP

(57) ABSTRACT

Provided is an apparatus and method for controlling a portable terminal. The apparatus includes a contact sensing unit which senses an area of an external surface of the portable terminal contacted by a user as the user holds the portable terminal, a recognizing unit which recognizes a function mode of the portable terminal based on information about the contacted area sensed by the contact sensing unit, and a control unit which changes the portable terminal to a function mode recognized by the recognizing unit. Since a function mode of the portable terminal is controlled according to the way a user holds the portable terminal, convenience of changing a function mode of the portable terminal is provided through a single manipulation.

23 Claims, 14 Drawing Sheets

(A)SMS MODE (B)DIGITAL CAMERA MODE (C)LEFT-HAND CALL MODE (D)RIGHT-HAND CALL MODE

(51) Int. Cl.
  *G06F 1/16* (2006.01)
  *H04M 1/725* (2006.01)

(56) References Cited

U.S. PATENT DOCUMENTS

| | | | |
|---|---|---|---|
| 6,549,756 B1* | 4/2003 | Engstrom | 455/66.1 |
| 6,873,951 B1* | 3/2005 | Lin | G10L 15/065 379/88.01 |
| 7,068,256 B1 | 6/2006 | Gettemy et al. | |
| 2001/0029196 A1 | 10/2001 | Wakamatsu | |
| 2001/0047416 A1 | 11/2001 | Yoshimura | |
| 2002/0132634 A1* | 9/2002 | Hiltunen | 455/550 |
| 2003/0013484 A1 | 1/2003 | Nishimura et al. | |
| 2004/0263479 A1 | 12/2004 | Shkolnikov | |
| 2005/0030387 A1 | 2/2005 | Pilu | |
| 2005/0035955 A1 | 2/2005 | Carter et al. | |
| 2005/0105775 A1 | 5/2005 | Luo et al. | |
| 2005/0212757 A1 | 9/2005 | Marvit et al. | |
| 2006/0017692 A1 | 1/2006 | Wehrenberg | |
| 2006/0052109 A1 | 3/2006 | Ashman | |
| 2006/0197750 A1 | 9/2006 | Kerr et al. | |

FOREIGN PATENT DOCUMENTS

| | | | |
|---|---|---|---|
| JP | 2004302734 A | * | 10/2004 |
| KR | 20-0315143 | | 5/2003 |
| KR | 10-2004-0051202 | | 6/2004 |

OTHER PUBLICATIONS

Office Action mailed Feb. 7, 2008 in corresponding U.S. Appl. No. 11/268,449.
Office Action mailed Oct. 16, 2008 in corresponding U.S. Appl. No. 11/268,449.
Office Action mailed Apr. 28, 2009 in corresponding U.S. Appl. No. 11/268,449.
Office Action mailed Dec. 4, 2009 in corresponding U.S. Appl. No. 11/268,449.
Office Action mailed Aug. 18, 2010 in corresponding U.S. Appl. No. 11/268,449.
Office Action mailed Dec. 22, 2010 in corresponding U.S. Appl. No. 11/268,449.
Office Action mailed May 6, 2011 in corresponding U.S. Appl. No. 11/268,449.
Office Action mailed Sep. 15, 2011 in corresponding U.S. Appl. No. 11/268,449.
Office Action issued Jan. 21, 2016 in copending U.S. Appl. No. 14/315,987.
Office Action issued Jul. 6, 2016 in copending U.S. Appl. No. 14/315,987.

* cited by examiner

| CONTACT SENSOR | S1 | S2 | S3 | S4 | S5 | S6 | S7 | S8 | S9 | S10 | S11 |
|---|---|---|---|---|---|---|---|---|---|---|---|
| OUTPUT SIGNAL | low | low | low | low | high | low | high | low | high | high | high |
| CONTACT SENSOR | S12 | S13 | S14 | S15 | S16 | S17 | S18 | S19 | S20 | S21 | S22 |
| OUTPUT SIGNAL | high | low | low | high | high | high | high | low | low | high | high |
| BIT SEQUENCE | 0000101011100111 ... ... | | | | | | | | | | |

↑ S1 S2 S3 ... S21 S22

FIG. 9
(A) SMS MODE
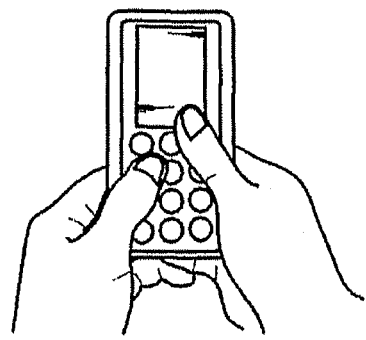
(B) DIGITAL CAMERA MODE
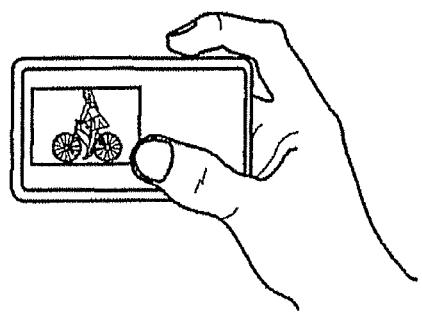
(C) LEFT-HAND CALL MODE
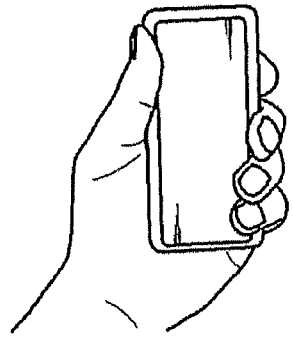
(D) RIGHT-HAND CALL MODE
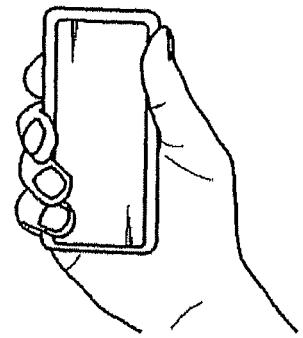

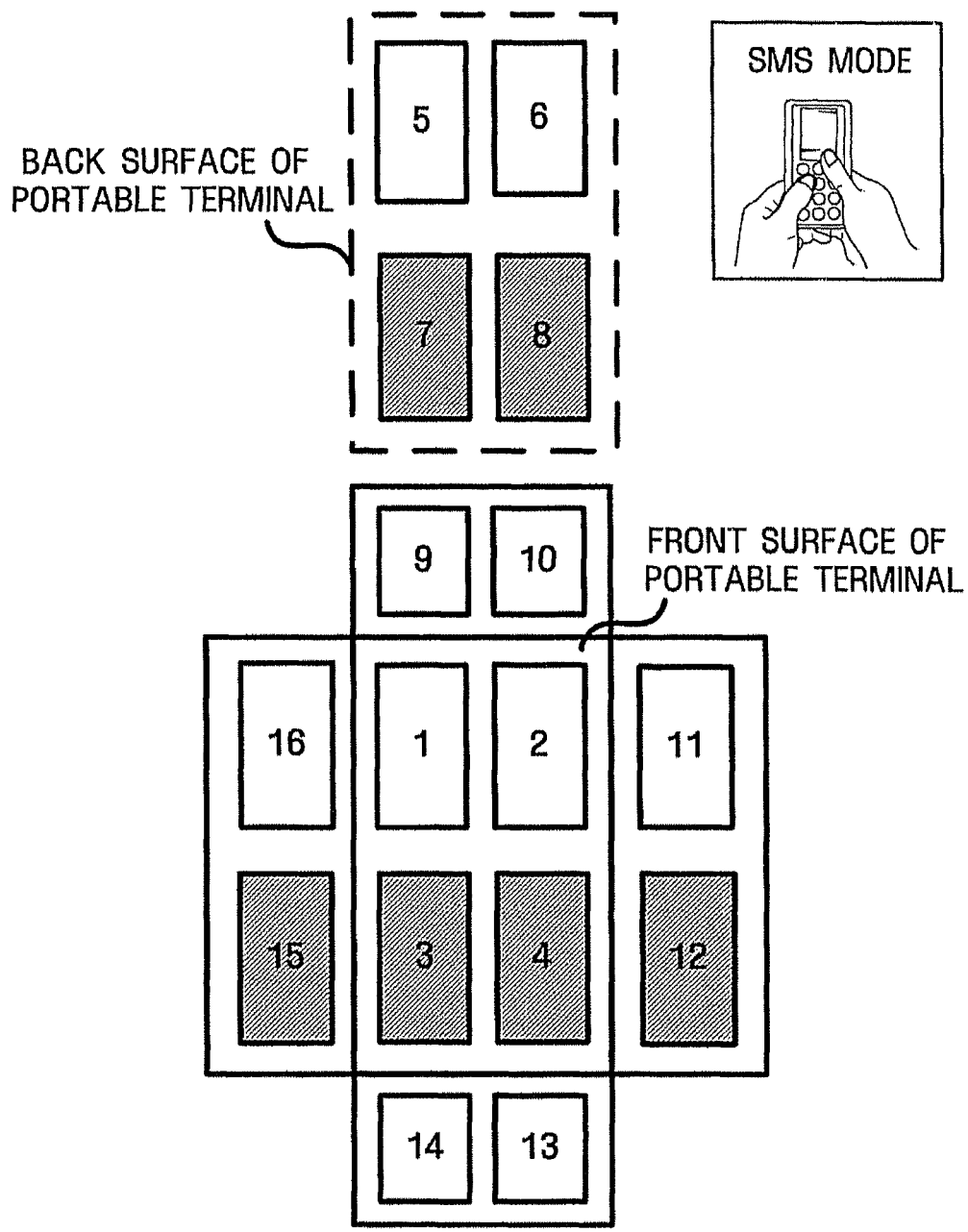

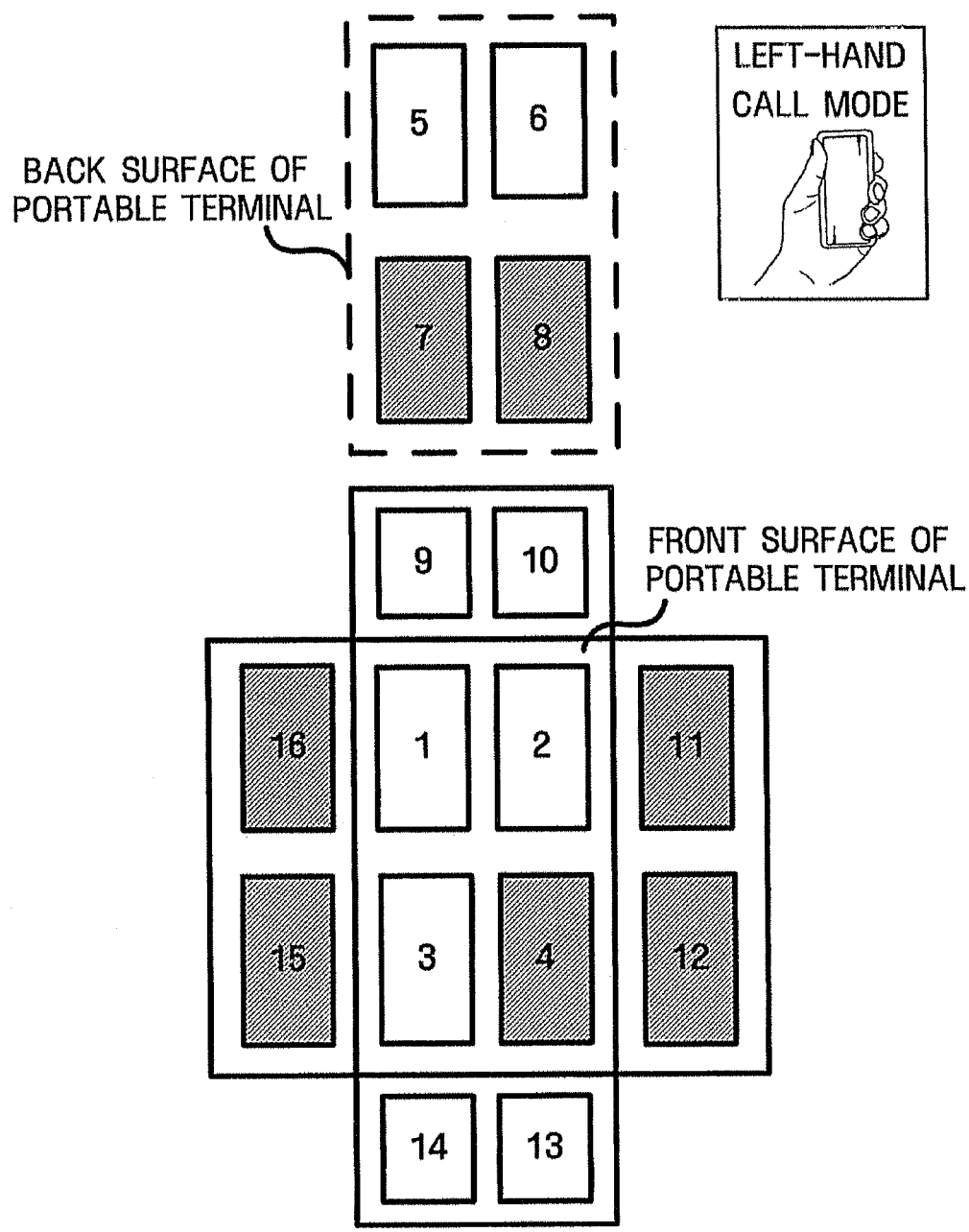

APPARATUS AND METHOD FOR CONTROLLING PORTABLE TERMINAL

CROSS-REFERENCE TO RELATED APPLICATION

This application is a continuation of U.S. application Ser. No. 11/268,449, filed Nov. 8, 2005 now U.S. Pat. No. 8,103,263, which claims benefit from Korean Patent Application No. 10-2004-0095293 filed on Nov. 19, 2004 in the Korean Intellectual Property Office, the disclosure of all of which are incorporated herein by reference.

BACKGROUND OF THE INVENTION

1. Field of the Invention

The present invention relates to an apparatus and method for controlling a portable terminal and, more particularly, to an apparatus and method for controlling a portable terminal, in which a function mode of the portable terminal is changed according to the way in which a user holds the portable terminal.

2. Description of the Related Art

With the increasingly widespread use of portable terminals such as cellular phones and personal digital assistants (PDA), portable terminals are now being designed to perform multiple functions. For example, a cellular phone was originally a terminal having a call function, but it has recently evolved to incorporate a short message service (SMS), a digital camera, an MP3 player, and moving picture playback. Thus, users can enjoy the convenience of a variety of functions without toting a plethora of devices.

In general, to operate a portable terminal having a plurality of functions in a specific function mode, a user searches for the specific function mode in which a desired function is implemented by manipulating a keypad or a contact pad included in the portable terminal and commands the terminal to change to the specific function mode.

For example, as shown in FIG. 1, a user manipulates a direction key 20 included in a portable terminal while looking at a menu screen provided through a display unit 10 of the portable terminal to search for a desired function mode. Once the desired function mode is found through the display unit 10, the user can select the desired function mode by manipulating a selection button 30. Upon selection of the function mode, the portable terminal enters the selected function mode.

However, in such a conventional technique, a user has to experience the inconvenience of going through a multi-stage key input process to change a portable terminal to a desired function mode.

To facilitate a mode change of a portable terminal, hot keys 41 and 42 are included in the portable terminal. Key values for changing the portable terminal to specific function modes are mapped to the hot keys 41 and 42. Thus, the user can change the portable terminal to a desired function mode through manipulation of the hot keys 41 and 42.

However, when using the hot keys 41 and 42, a user who is unaccustomed to the use of the portable terminal should be fully aware of which hot key is mapped to which function mode. In addition, since the number of hot keys that can be included in a portable terminal is limited, assigning hot keys to every function mode of the portable terminal wastes space in a key interface included in the portable terminal.

Korean Utility Model Registration No. 20-0315143, titled "Apparatus for Controlling Menu Using Position Sensor of Mobile Communication Terminal", discloses an apparatus for controlling a menu, which detects motion or the position of a portable terminal held in a user's hand using a predetermined sensor and controls a direction key of the portable terminal or a function mode searching process for changing a function mode of the portable terminal according to the detection results. However, when using the disclosed apparatus, a user has to manipulate a portable terminal a number of times to select a specific function mode of the portable terminal until the specific function mode of the portable terminal is found. Moreover, even after the specific function mode is found, the user has to operate or effect a mode change using a selection button included in the portable terminal to change the portable terminal to the specific function mode. As a result, even when using the disclosed apparatus, the user has to experiences the inconvenience of manipulating the portable terminal through multiple stages to change a function mode of the portable terminal.

SUMMARY OF THE INVENTION

Additional aspects and/or advantages of the invention will be set forth in part in the description which follows and, in part, will be apparent from the description, or may be learned by practice of the invention.

The present invention provides an apparatus and method for controlling a portable terminal, in which a function mode of the portable terminal is changed using information that is acquired due to user's holding of the portable terminal, thereby allowing a user to change a function mode of the portable terminal through a single manipulation.

The above stated object as well as other objects, features and advantages, of the present invention will become clear to those skilled in the art upon review of the following description.

According to an aspect of the present invention, there is provided an apparatus for controlling a portable terminal apparatus, the apparatus including a contact sensing unit which senses an area of an external surface of the portable terminal contacted by a user as the user holds the portable terminal, a recognizing unit which recognizes a function mode of the portable terminal based on information about the contacted area sensed by the contact sensing unit, and a control unit which changes the portable terminal to a function mode recognized by the recognizing unit.

According to an aspect of the present invention, there is provided a method for controlling a portable terminal, the method including (a) sensing an area of an external surface of the portable terminal contacted by a user as the user holds the portable terminal, (b) recognizing a function mode of the portable terminal using information about the contacted area sensed by the contact sensing unit, and (c) changing the portable terminal to a function mode recognized by the recognizing unit.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5B is a chart explaining information about a user-contacted area, which is output by the contact sensing unit;

FIG. 9 illustrates function modes of a portable terminal to be recognized through simulation; and FIGS. 10A to 10D are views for explaining contact information corresponding to function modes of a portable terminal for simulation.

DETAILED DESCRIPTION OF THE PREFERRED EMBODIMENTS

Figure 1:
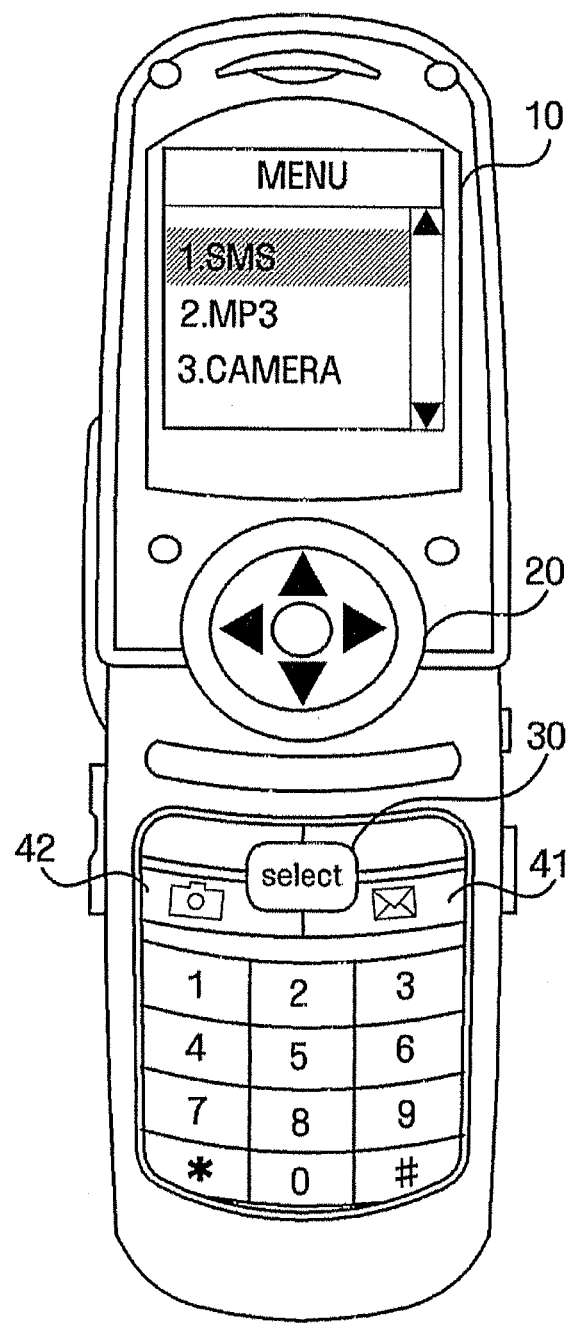
FIG. 1 is a view for explaining a conventional process of changing a function mode of a portable terminal.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Preferred embodiments of the present invention will now be described in detail with reference to the accompanying drawings.

Figure 2:
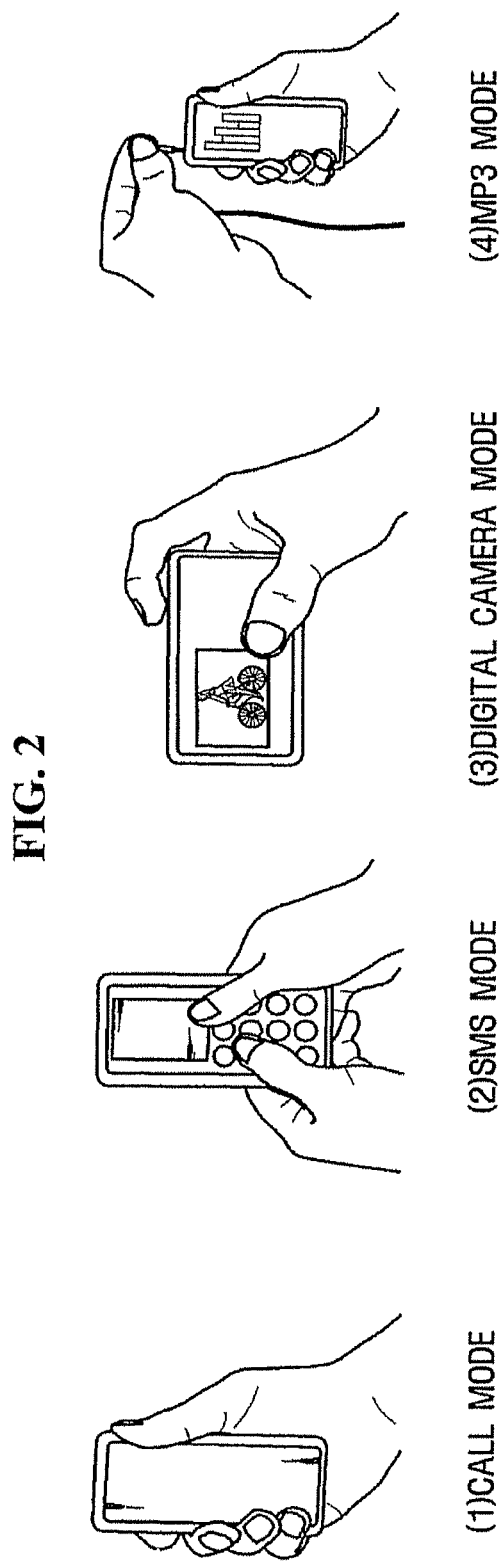
FIG. 2 is a view illustrating a relationship between different ways of holding a portable terminal and function modes of the portable terminal.

FIG. 2 is a view illustrating a relationship between different ways of holding a portable terminal and function modes of the portable terminal.

The portable terminal can have various function modes such as a call mode, an SMS mode, and a digital camera mode. When a user uses the portable terminal, the way in which he or she holds the portable terminal varies according to the desired function mode of the portable terminal, as shown in FIG. 2. In the present invention, information about the way in which the user holds a portable terminal (which will be referred to as holding information) may be used as control information for recognizing a function mode desired by the user and changing the portable terminal to the recognized function mode. Thus, according to the present invention, a user-desired function mode of a portable terminal can be recognized according to the holding information.

The holding information may be information about an area of the external surface of a portable terminal contacted by a user (specifically, by the hand of a user who holds the portable terminal). This information will be referred to as contact information. In addition, the holding information may be information about an angle of rotation or the orientation of a portable terminal (which will be referred to as motion information) when the portable terminal rotates with respect to a predetermined reference axis that is preset in the portable terminal or the portable terminal is inclined by a predetermined angle with respect to the gravity direction as the user holds the portable terminal.

Information about whether an external device is attached to or detached from the portable terminal may also be used as control information for recognizing a function mode desired by the user, along with the holding information including the contact information and the motion information.

Figure 3:
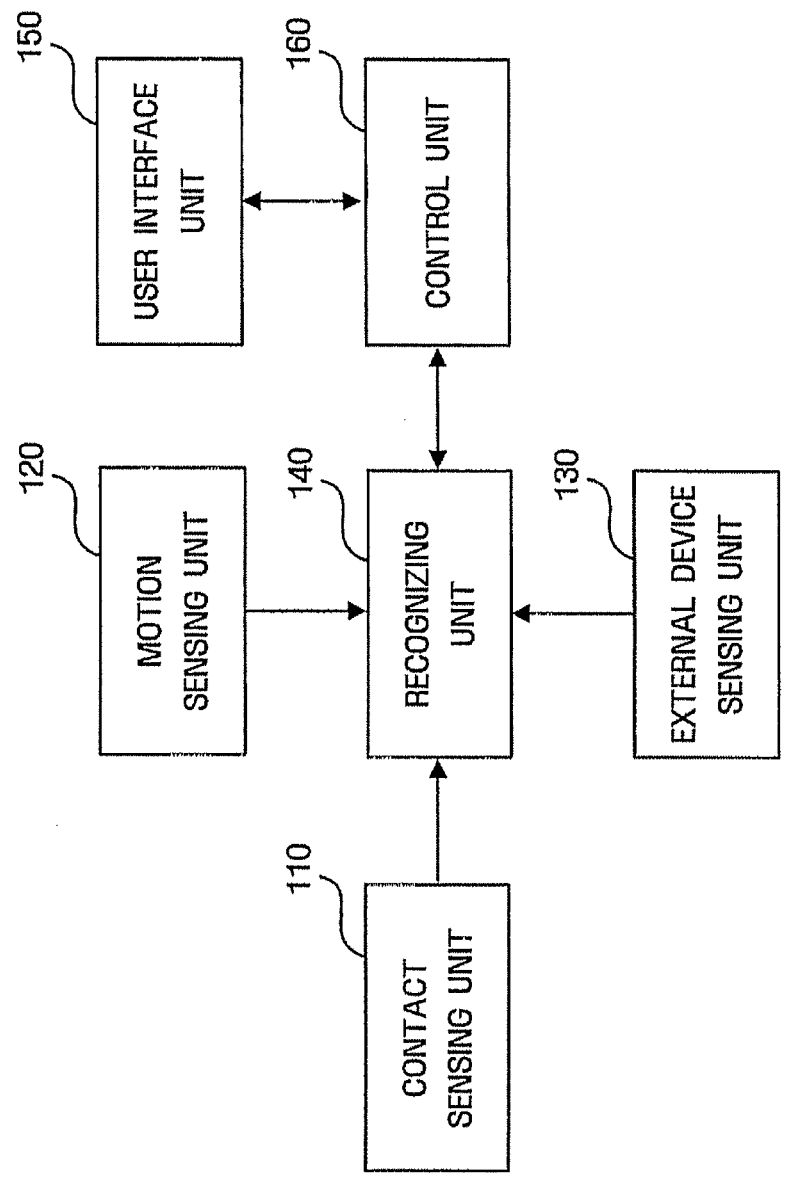
FIG. 3 is a block diagram of an apparatus for controlling a portable terminal according to an embodiment of the present invention.

FIG. 3 is a block diagram of an apparatus for controlling a portable terminal according to an embodiment of the present invention.

The apparatus for controlling a portable terminal includes a contact sensing unit 110 that senses a user's contact area; a motion sensing unit 120 that senses motion (e.g., rotation or orientation) of the portable terminal; an external device sensing unit 130 that senses attachment or detachment of an external device; a recognizing unit 140 that recognizes a function mode of the portable terminal using information sensed by the contact sensing unit 110, the motion sensing unit 120, and the external device sensing unit 130; a user interface unit 150 to which a control command is input from the user; and a control unit 160 that changes the portable terminal to a function mode recognized by the recognizing unit 140.

The contact sensing unit 110 senses an area of the external surface of the portable terminal contacted by a user as the user holds the portable terminal. To this end, the contact sensing unit 110 includes one or more contact sensors capable of sensing a user's contact. Each of the contact sensors may be positioned on the surface of the portable terminal. An example of such a configuration will be described later with reference to FIG. 5A.

The contact sensors may be contact-type sensors that sense a direct contact with the user, but are not limited thereto. Thus, the contact sensors may be contactless sensors capable of sensing that a user's body (specifically, a user's hand) is within a predetermined distance without being directly contacted by the user and determining that the contact occurs.

Hereinafter, the contact sensing unit 110 will be described in detail with reference to FIGS. 4 through 5B.

Figure 4:
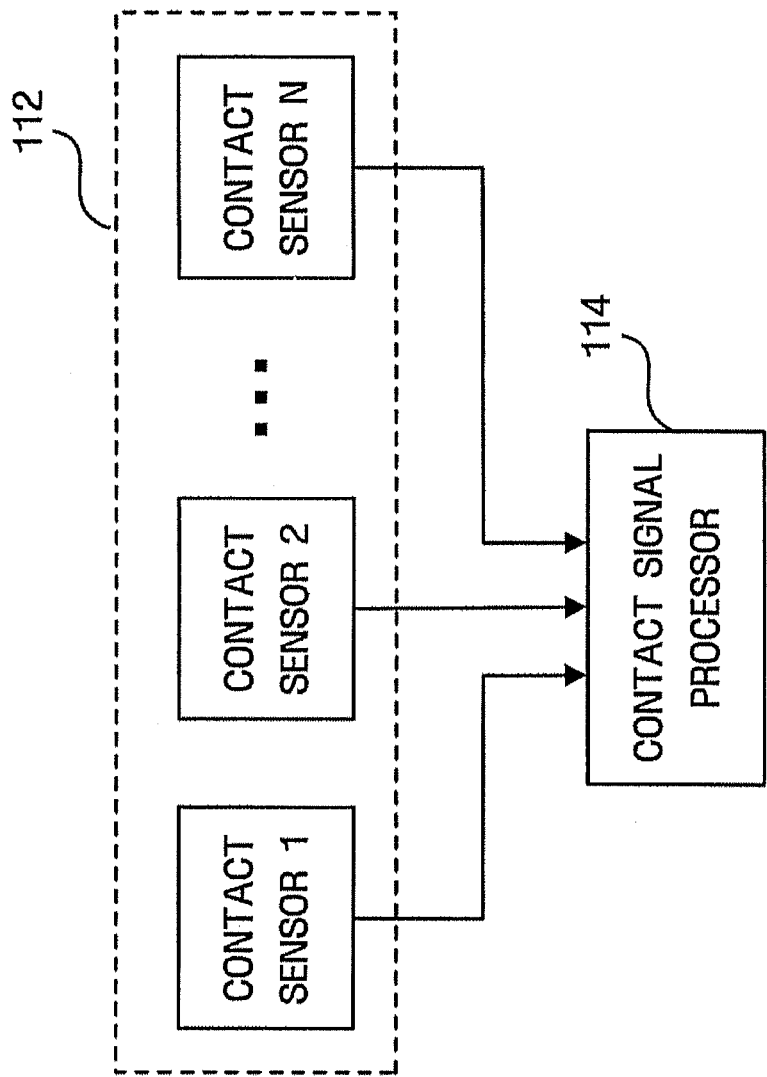
FIG. 4 is a detailed block diagram of a contact sensing unit shown in FIG. 3.

FIG. 4 is a detailed block diagram of the contact sensing unit 110 shown in FIG. 3.

The contact sensing unit 110 includes one or more contact sensors 112 and a contact signal processor 114. The contact sensors 112 sense a user's contact and output a signal indicating the contact to the contact signal processor 114. The contact sensors 112 may be contact-type sensors or contactless sensors as described above.

The contact signal processor 114 combines signals indicating contact, which are provided from the contact sensors 112, and provides the combination result to the recognizing unit 140 as contact information. An example of contact information provided by the contact signal processor 114 to the recognizing unit 140 will be described later with reference to FIG. 5B.

Figure 5A:
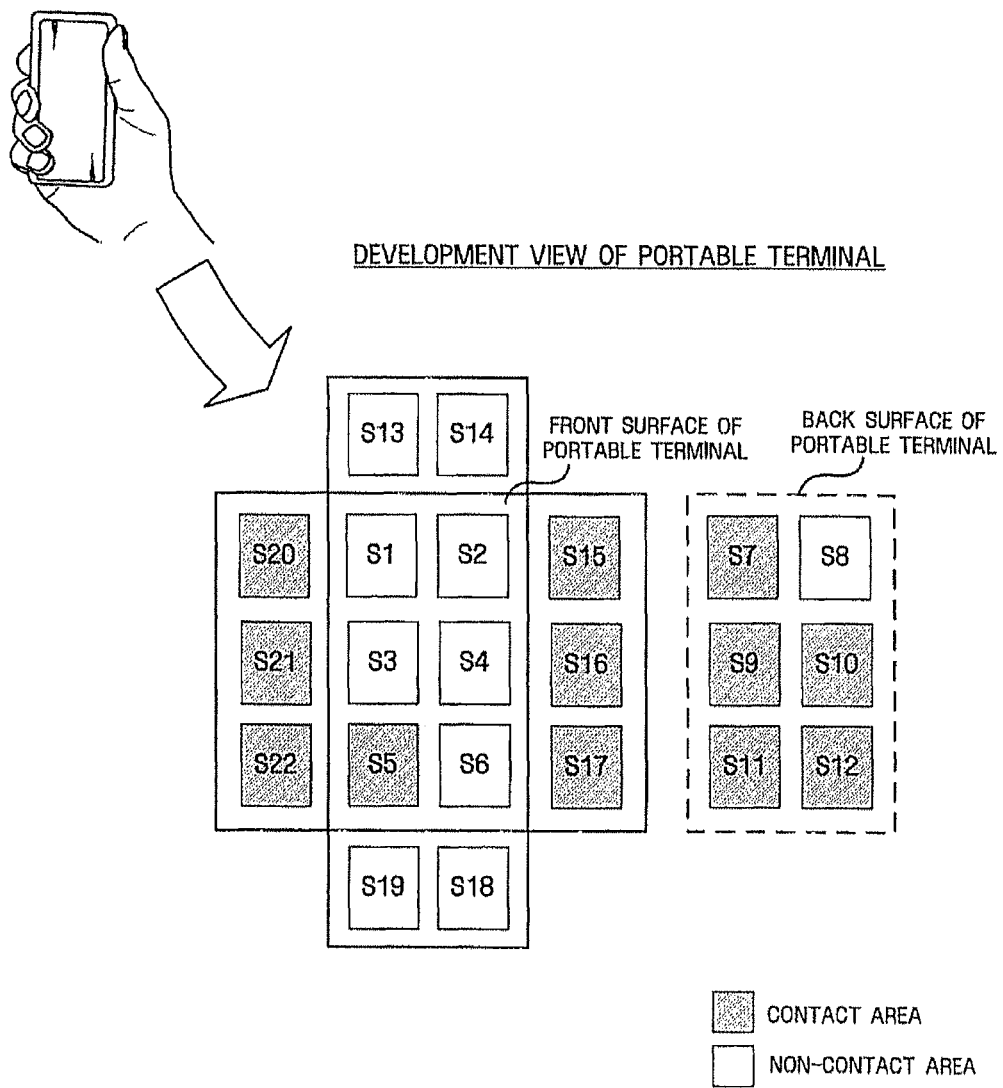
FIG. 5A is a view for explaining a contact sensing unit of an apparatus for controlling a portable terminal according to an embodiment of the present invention.

FIG. 5A is a development view of a portable terminal that is assumed to be a rectangular parallelepiped. Blocks in the development view indicate contact sensors S1 through S22 on the surface of the portable terminal, which are capable of sensing a user's contact. Once the contact sensors S1 through S22 sense a user's contact, the contact signal processor 114 provides the contact information to the recognizing unit 140.

For example, each of the contact sensors S1 through S22 shown in FIG. 5A outputs a signal indicating a user's contact, and the contact signal processor 114 combines signals output from the contact sensors S1 through S22 into one bit sequence to generate the contact information and provides the contact information to the recognizing unit 140. An example of the contact information is shown in FIG. 5B.

When the user holds the portable terminal as shown in FIG. 5A, the contact sensors S1 through S22 output signals indicating a user's contact as shown in FIG. 5B. In FIG. 5B, a 'high' signal indicates a corresponding contact sensor is contacted by the user and a 'low' signal indicates a corresponding contact sensor is not contacted by the user. In FIG. 5B, the contact sensors S5, S7, S9, S10, S11, S12, S15, S16, S17, S20, S21, and S22 that are shown as being contacted by the user in FIG. 5A output 'high' signals. The contact information provided to the recognizing unit 140 may be a bit sequence composed of signals output from the contact sensors. In FIG. 5B, a bit sequence composed of 1s ('highs') and 0s ('lows') is shown. The recognizing unit 140 to which the bit sequence is input obtains information about a user-contacted area.

In FIG. 5A, the contact sensors S1 through S22 are mounted over the entire surface of the portable terminal, but can be mounted mainly in a specific area of the portable terminal (e.g., an area that is frequently contacted by the user) according to the characteristic of the portable terminal. In addition, the number of contact sensors mounted on the surface of the portable terminal according to an embodiment of the present invention is not limited to the number of contact sensors shown in FIG. 5A.

The motion sensing unit 120 senses a motion of the portable terminal, caused by user's holding of the portable terminal. More specifically, as the user holds the portable terminal, if the portable terminal rotates with respect to a predetermined reference axis or is inclined by a predetermined angle with respect to the gravity direction, the motion sensing unit 120 senses rotation of the portable terminal and an orientation with respect to the gravity direction.

To this end, the motion sensing unit 120 can include an inertial sensor or an acceleration sensor manufactured using a mechanical or micro electro-mechanical system (MEMS) technique. For example, if the motion sensing unit 120 is manufactured using a gyroscope, it can measure an angle through which the portable terminal rotates. If the motion sensing unit 120 is manufactured using an MEMS acceleration sensor, it can measure not only an angle through which the portable terminal rotates but also an angle between the predetermined reference axis of the portable terminal and the gravity direction, caused by inclination of the portable terminal.

Figure 6:
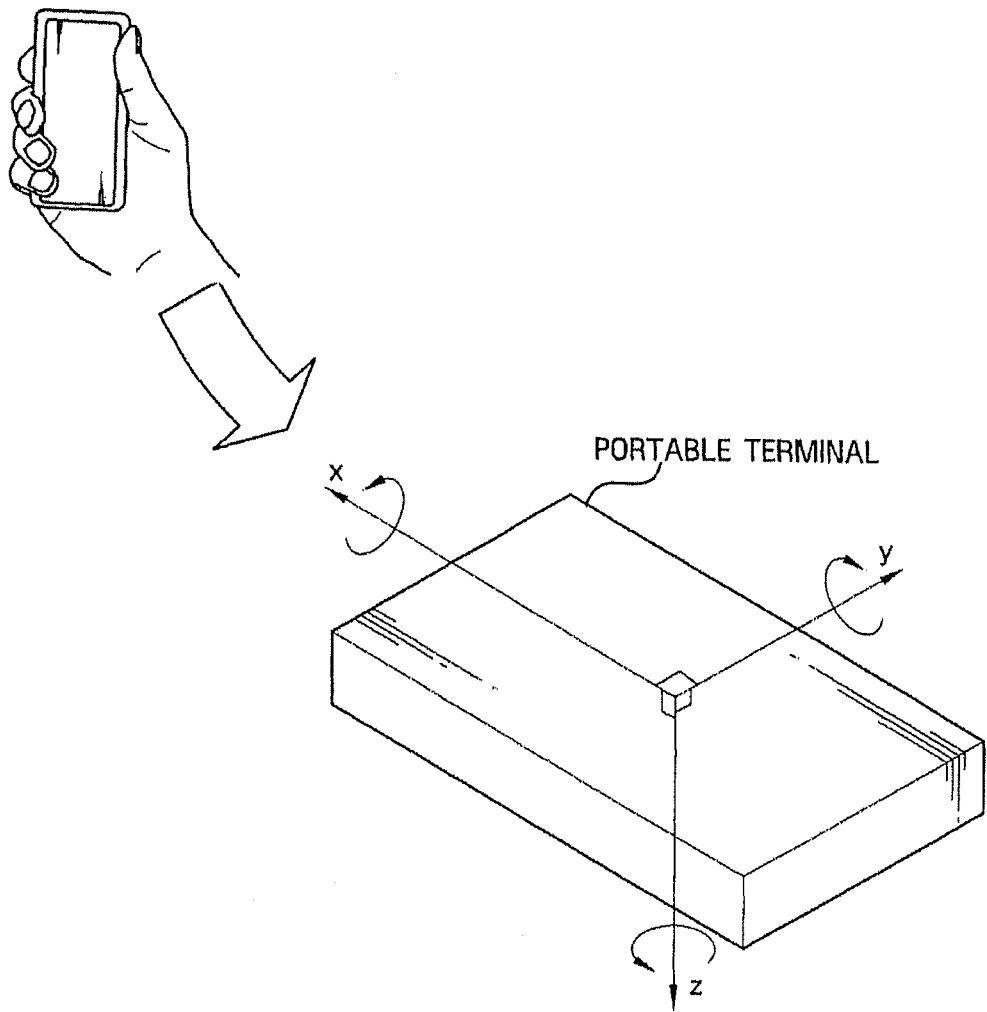
FIG. 6 is a view for explaining a motion sensing unit of an apparatus for controlling a portable terminal according to an embodiment of the present invention.

For example, the motion sensing unit 120 may include inertial sensors (not shown) mounted along three reference axes (x, y, and z) that are orthogonal to one another as shown in FIG. 6. Thus, when the portable terminal moves as the user holds the portable terminal, a rotation angle of the portable terminal with respect to each of the three reference axes can be measured. Alternatively, if acceleration sensors are included in the portable terminal of FIG. 6, an orientation of the portable terminal can be sensed by measuring an angle of each of the three reference axes with respect to the gravity direction. Motion information sensed by the motion sensing unit 120 is provided to the recognizing unit 140.

Although rotation and/or an orientation of the portable terminal with respect to three orthogonal reference axes (x, y, and z) is sensed in FIG. 6, the present invention is not limited thereto and rotation or an orientation of the portable terminal with respect to more than or less than three reference axes may be sensed according to an aspect of the present invention.

The external device sensing unit 130 senses attachment or detachment of the external device. The external device is a device such as an earphone or a secure digital (SD) card that can be attached to the portable terminal in order for the user to use the portable terminal in a specific function mode. For example, when the user desires to use the portable terminal in an MP3 player mode, the user may connect an earphone to the portable terminal and the external device sensing unit 130 senses attachment or detachment of the earphone. The user may attach a portable storage device such as an SD card or a multi media card (MMC) that stores moving picture data or license for moving picture playback to the portable terminal to play the moving picture data using the portable terminal. Then, the external device sensing unit 130 may sense attachment or detachment of the portable storage device. Information sensed by the external device sensing unit 130 is provided to the recognizing unit 140 and may be used as control information for recognizing a function mode of the portable terminal.

The recognizing unit 140 uses information provided from the contact sensing unit 110, the motion sensing unit 120, and the external device sensing unit 130 to recognize a function mode of the portable terminal. To this end, the recognizing unit 140 may store the holding information of the portable terminal (the contact information and the motion information) for recognizing a function mode of the portable terminal as a recognition model. The information about attachment or detachment of the external device may also be included in the recognition model. The recognition model may be obtained by experimentally measuring average holding information input by users when the users use a corresponding function mode of the portable terminal and may be stored in the portable terminal at the time of manufacturing the portable terminal.

A user-contacted area or a motion of the portable terminal may vary from user to user, and the recognizing unit 140 may update the recognition model according to the characteristics of a user's hold. The recognizing unit 140 will be described in detail with reference to FIG. 7.

The controlling unit 160 may change a function mode of the portable terminal recognized by the recognizing unit 140. Thus, once the user holds the portable terminal to use the portable terminal in a desired function mode, the portable terminal can be automatically changed to the desired function mode based on the holding information. In other words, the inconvenience of manipulating the portable terminal through multi-stages to change the portable terminal to a desired function mode can be reduced. It is also understood that the control unit 160 may provide the state of the mode would be changed prior to changing to the desired function mode.

In addition, the control unit 160 can provide the state of the mode-changed portable terminal to the user through the user interface unit 150.

The user may input information about whether the changed function mode is the desired function mode through the user interface unit 150, and the control unit 160 may provide the information to the recognizing unit 140.

Figure 7:
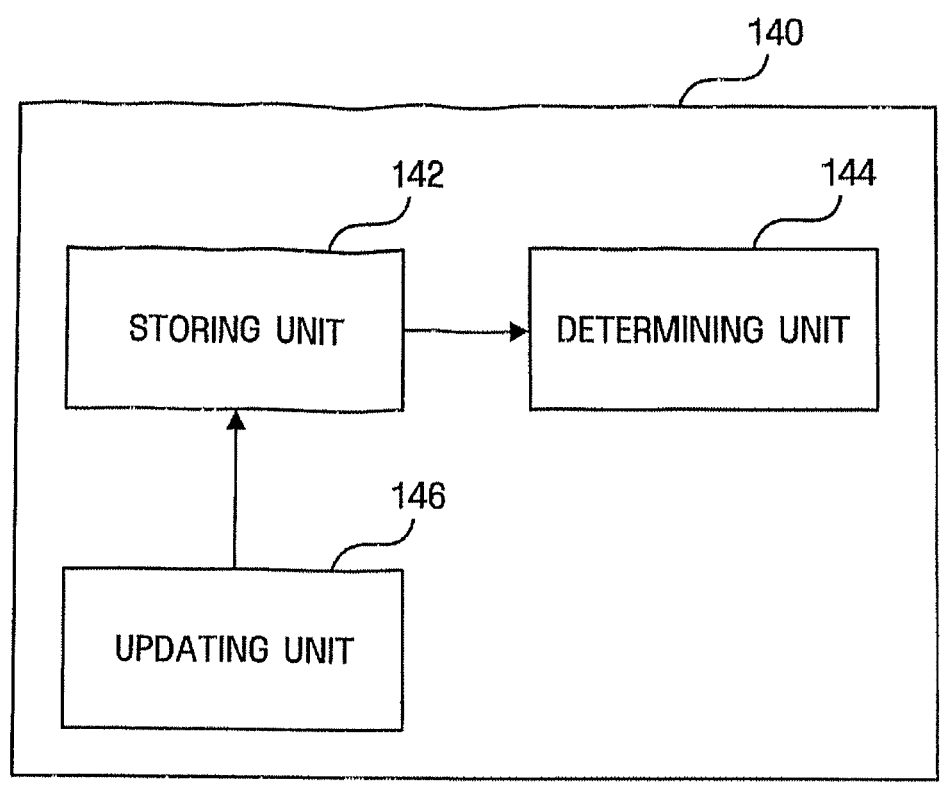
FIG. 7 is a detailed block diagram of a recognizing unit shown in FIG. 3.

FIG. 7 is a detailed block diagram of the recognizing unit 140 shown in FIG. 3.

Referring to FIG. 7, the recognizing unit 140 includes a storing unit 142 that stores previously set recognition models; a determining unit 144 that selects a function mode of the portable terminal that is suitable for information input from the contact sensing unit 110, the motion sensing unit 120, and the external device sensing unit 130; and an updating unit 146 that updates a corresponding recognition model stored in the storing unit 142.

The storing unit 142 stores the recognition models that are criteria for recognizing function modes of the portable terminal. The recognition models are experimentally obtained according to the characteristics of the portable terminal and may be previously stored at the time of manufacturing the portable terminal. For example, when users use the portable terminal in a call mode, if experimentally obtained average areas that are mainly contacted by the users are as shown in FIG. 5A, it is possible to set a recognition model for recognizing a case where the users contact the average areas shown in FIG. 5A as the call mode.

The recognition model can be set for each function mode of the portable terminal by a combination of contact information and motion information of the portable terminal, i.e., holding information based on the way in which a user holds the portable terminal. Information about attachment or detachment of the external device may also be used as basic information for setting the recognition model. The recognition model stored in the storing unit 142 will be described in more detail with reference to Equations 1 through 3.

The recognition model indicating a relationship between holding information based on the way in which a user holds the portable terminal and a function mode of the portable terminal can be expressed using P(M|I) indicating a probability of an predetermined function mode M being selected when specific holding information I is input. The probability is proportional to Equation 1 according to Byes rule:

$$P(M)P(I|M) \tag{1}$$

where P(M) indicates a probability of a predetermined function mode M being selected and can be calculated using Equation 2:

$$P(M) = \frac{Y}{X} \tag{2}$$

where X represents the number of times a user holds the portable terminal to select the predetermined function mode M and Y represents the number of times the arbitrary function mode M is selected when the user holds the portable terminal.

In Equation 1, P(I|M) indicates a probability of the holding information I being input when the arbitrary function mode M is selected and can be explained using Equation 3:

$$P(I|M) = \Pi_i P(I_i|M) \tag{3}$$

where $I_i$ represents information input from the contact sensing unit 110, the motion sensing unit 120, and the external device sensing unit 130. For example, $I_i$ may be the contact information of the portable terminal, which is input from the contact sensing unit 110, as described with reference to FIGS. 5A and 5B. $I_i$ may also be the motion information of the portable terminal, which is input from the motion sensing unit 120, as described with reference to FIG. 6. Preferably, $I_i$ is information input from the contact sensing unit 110 and the motion sensing unit 120. $I_i$ may also include information about attachment or detachment of the external device, which is output from the external device sensing unit 130. Thus, I on the left side of Equation 3 represents a combination of the information input from the contact sensing unit 110, the motion sensing unit 120, and the external device sensing unit 130.

Using the recognition models stored in the storing unit 142, the determining unit 144 selects a function mode based on the information input from the contact sensing unit 110, the motion sensing unit 120, and/or the external device sensing unit 130 as the user holds the portable terminal. Here, the function mode selected by the determining unit 144 satisfies Equation 4:

$$\arg\max_{m \in M} P(m|I) = \arg\max_{m \in M} P(m)\Pi_i P(I_i|m) \tag{4}$$

where M represents an arbitrary function mode of the portable terminal and m represents a specific function mode of the portable terminal.

Thus, the determining unit 144 may make a determination that a specific function mode is recognized using a recognition model that is closest to information input from the contact sensing unit 110, the motion sensing unit 120, and/or the external device sensing unit 130 within a threshold among the recognition models stored in the storing unit 142.

The updating unit 146 updates a corresponding recognition model stored in the storing unit 142 based on whether the function mode recognized through the determination of the determining unit 144 is a function mode desired by the user. To this end, the updating unit 146 may update P(M) of Equation 2 as follows.

If the function mode recognized through the determination of the determining unit 144 is the function mode desired by the user, P(M) of Equation 2 can be updated with $$P(M) = \frac{Y+1}{X+1}. \tag{5}$$

Unless the function mode recognized through the determination of the determining unit 144 is the function mode desired by the user, P(M) of Equation 2 can be updated with $$P(M) = \frac{Y}{X+1}. \tag{6}$$

The user can input information through the user interface unit 150 about whether the function mode recognized through the determination of the determining unit 144 is desired by the user.

The recognition models stored in the storing unit 142 are gradually updated to fit a user's personal holding characteristics through repetitive recognition successes and failures of the recognizing unit 140 for a function mode desired by the user based on information input from the contact sensing unit 110, the motion sensing unit 120, and/or the external device sensing unit 130 as the user holds the portable terminal. Thus, mode recognition based on the characteristics of a user's hold is possible.

Hereinafter, operations of functional blocks of the apparatus for controlling a portable terminal according to an embodiment of the present invention will be described with reference to FIG. 8.

Figure 8:
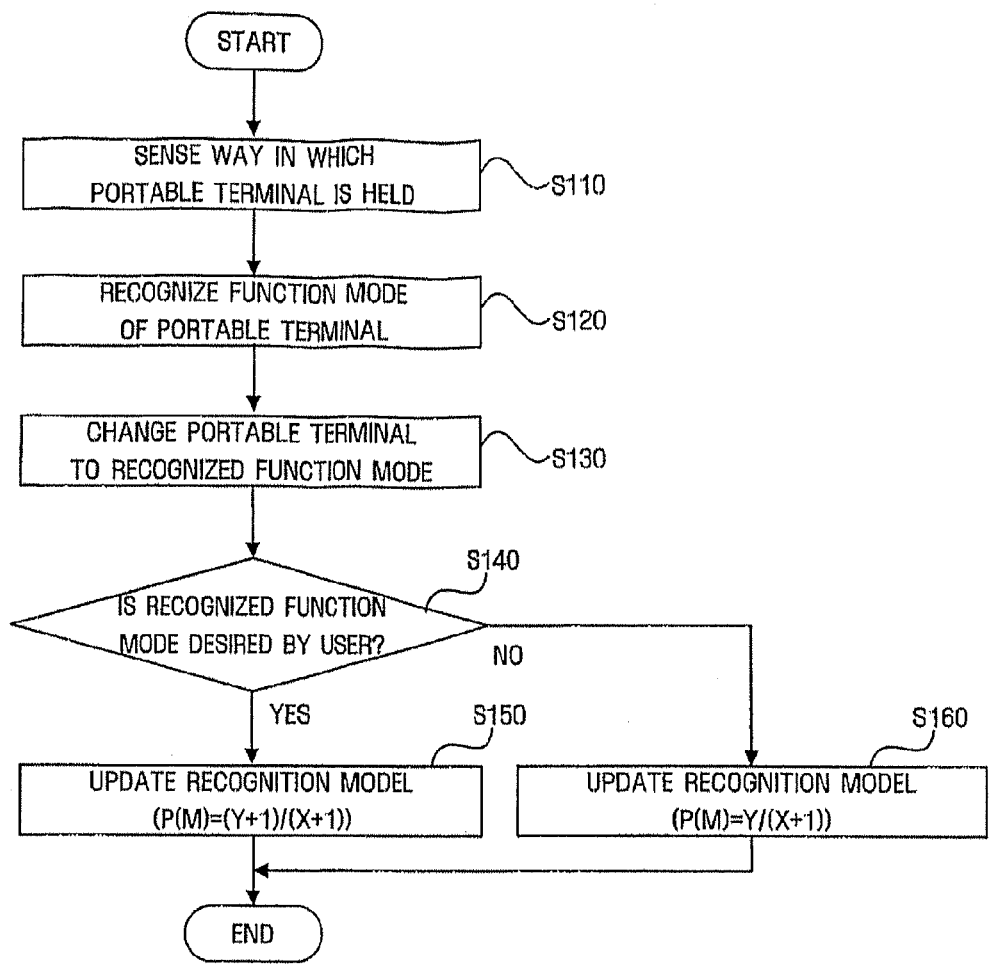
FIG. 8 is a flowchart illustrating a process of controlling a portable terminal according to an embodiment of the present invention.
Figure 10B:
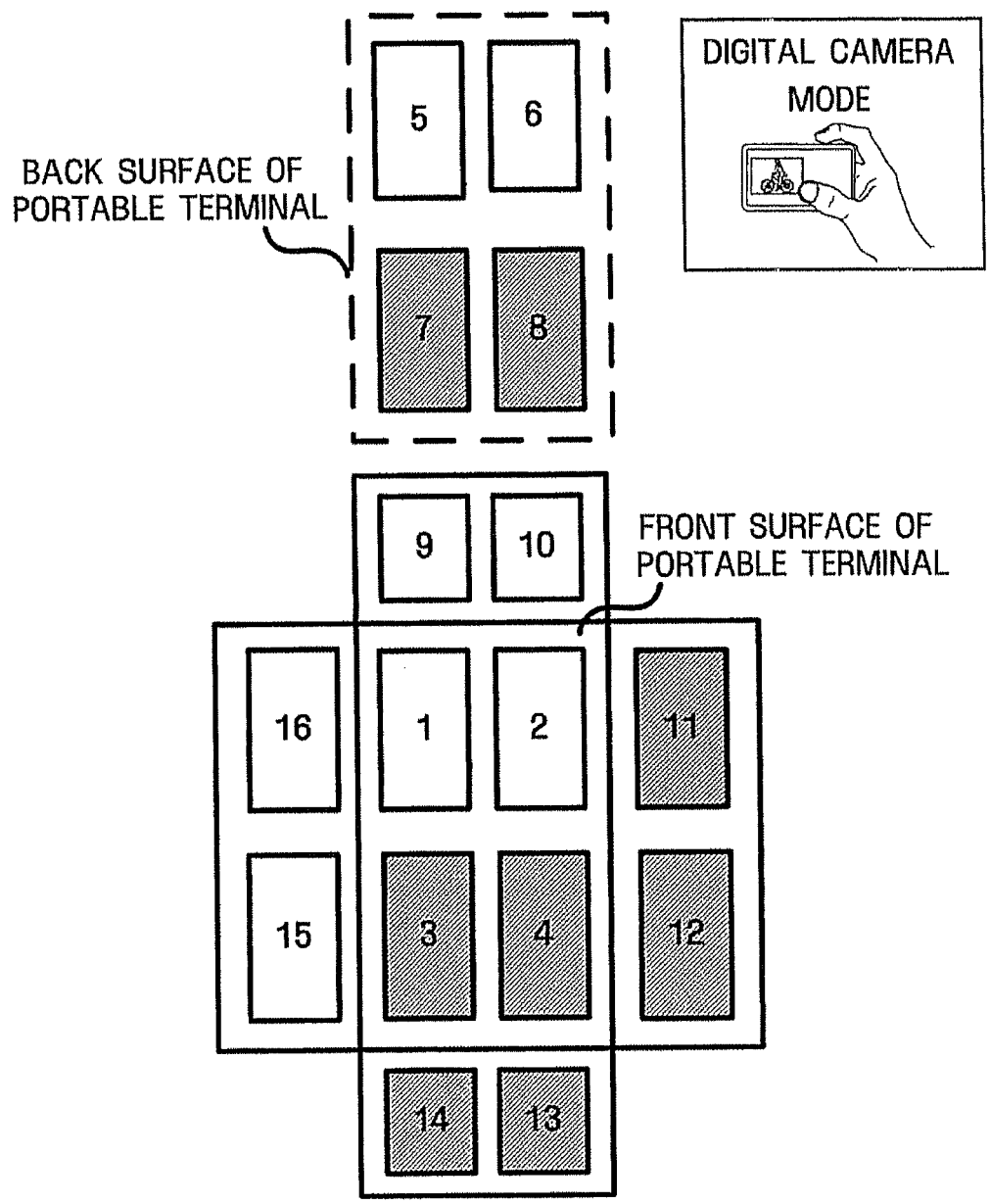
Figure 10D:
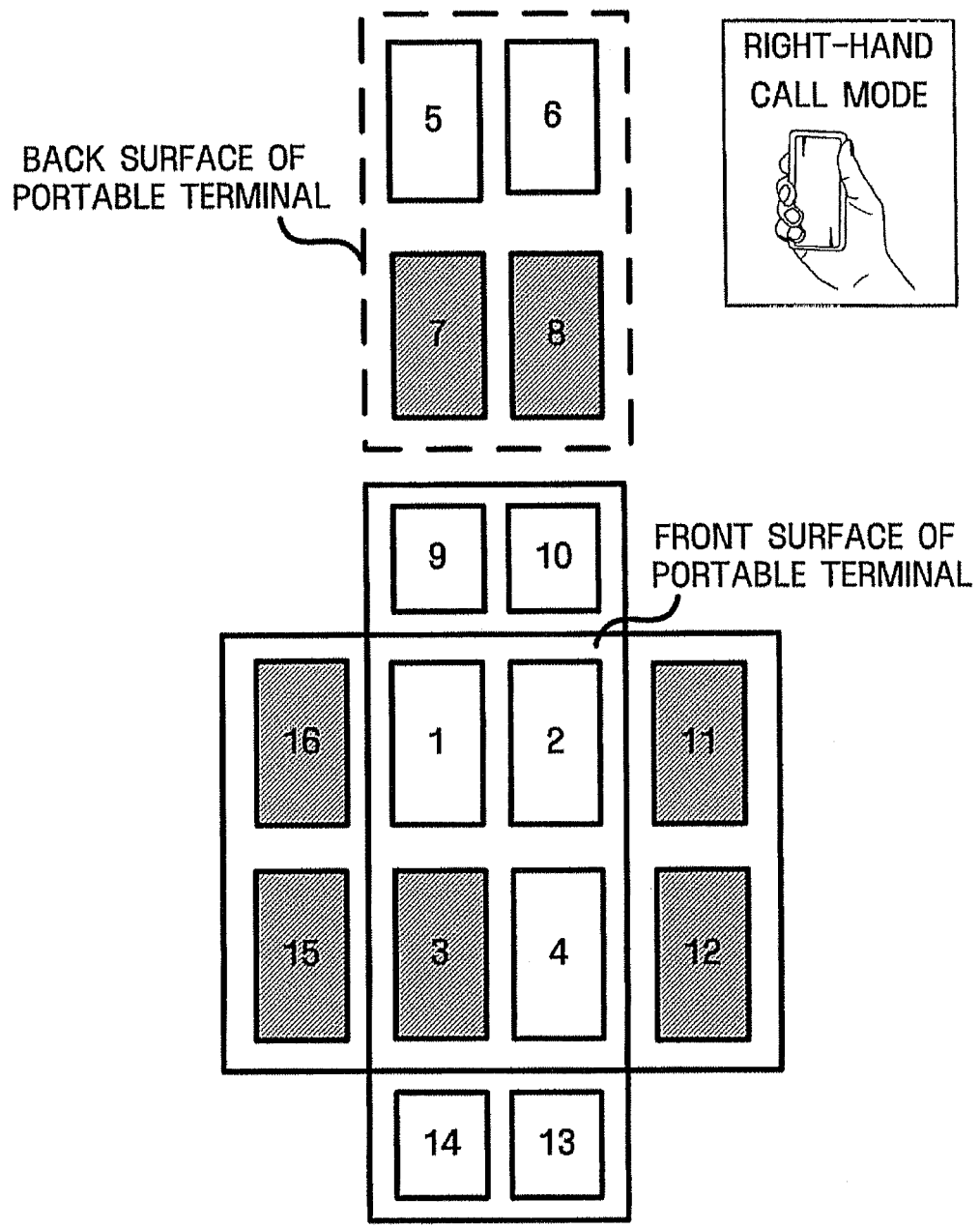

FIG. 8 is a flowchart illustrating a process of controlling a portable terminal according to an embodiment of the present invention.

In operation S110, as a user holds a portable terminal, the contact sensing unit 110, the motion sensing unit 120, and/or the external device sensing unit 130 sense a way in which the portable terminal is held based on an area of the surface of the portable terminal contacted by a user or the motion of the portable terminal.

Holding information output from the contact sensing unit 110, the motion sensing unit 120, and the external device sensing unit 130 according to the result of sensing is provided to the recognizing unit 140, and the recognizing unit 140 recognizes a function mode of the portable terminal using the holding information in operation S120.

Specifically, the determining unit 144 selects a function mode based on the input holding information using recognition models stored in the storing unit 142. The recognition models stored in the storing unit 142 and mode selection of the determining unit 144 are already described using Equations 1 through 4.

The function mode, which has been selected by the determining unit 144 and recognized by the recognizing unit 140, is provided to the control unit 160, and the control unit 160 changes the portable terminal to the function mode recognized by the recognizing unit 140 in operation S130.

The changed function mode can be provided to the user through the user interface unit 150, and the user can input information through the user interface unit 150 about whether the provided function mode is a function mode desired by the user.

The control unit 160 determines whether the function mode recognized by the recognizing unit 140 is the desired function mode using the information input by the user through the user interface unit 150 in operation S140 and provides information about the determination to the updating unit 146.

If the recognized function mode is the desired function mode, the updating unit 146 updates a corresponding recognition model stored in the storing unit 142 in operation S150. Updating is already described using Equation 5.

If the recognized function mode is not the desired function mode, the updating unit 146 updates a corresponding recognition model stored in the storing unit 142 as described using Equation 6, in operation S160.

Hereinafter, simulation results according to an embodiment of the present invention will be described. A portable terminal has a total of 4 function modes (an SMS mode, a digital camera mode, a left-hand call mode, and a right-hand call mode) as shown in FIG. 9.

For simulation, the contact sensing unit 110 of the portable terminal includes a total of 16 contact sensors as shown in FIGS. 10A to 10D. A standard signal that can be output from the contact sensing unit 110 is generated for each of the function modes and noise is added to the standard signal. Thus, a total of 120 data sets are generated. Each of the data sets is composed of (information about an area contacted by a user, function mode).

For simulation, a standard signal for motion information output from the motion sensing unit 120 of the portable terminal is generated using a motion tracking system. The standard signal is measured with respect to two reference axes of the portable terminal and is composed of (roll, pitch) for each function mode. Noise is added to the standard signal, and thus a total of 120 data sets are generated. Each data set is composed of a roll mode, a pitch mode, and a function mode.

Accordingly, when contact information and motion information are used as input information, each input data set for simulation is comprised of contact information, motion information and a function mode.

Simulation is performed using a neural network system, and three experimental groups are formed. As shown in Table 1, basic information is set for each of the experimental groups.

TABLE 1

| Experimental Group | First Group | Second Group | Third Group |
| --- | --- | --- | --- |
| Number of Input Nodes | 18 | 16 | 2 |
| Number of Hidden Layers | 1 | 1 | 1 |
| Number of Hidden Nodes | 18 | 18 | 18 |
| Number of Output Nodes | 4 | 4 | 4 |

In the first group, both contact information and motion information are used as input information for simulation. In this case, there are a total of 18 input nodes, including the sum of the number of 16 data sets generated by 16 contact sensors and 2 data sets, that is, roll information and pitch information generated by the motion sensing unit.

In the second group, only the contact information is used as the input information for simulation and the total number of input nodes is 16.

In the third group, only the motion information is used as the input information for simulation and the number of input nodes is 2.

The number of output nodes is 4, which is equal to the number of function modes to be recognized. In each of the experimental groups, the number of hidden layers and the number of hidden nodes are set to 1 and 18, respectively.

A learning rate, which is a simulation parameter, is set to 0.2 and an interaction value is set to 100. In each of the experimental groups, the 120 data sets are divided into 60 training data sets and 60 test data sets. The training data sets are used to train the portable terminal and the test data sets are used to examine the recognition success rate of the trained portable terminal.

Two types of simulations are performed for each of the experimental groups. In a first simulation, training data sets and test data sets are set as the same data sets. In a second simulation, training data sets and test data sets are set as different data sets.

A success rate of recognizing a function mode of a portable terminal using a neural network system according to each of the experimental groups and a type of simulation is as shown in Table 2.

TABLE 2

| | Success Rate of Recognizing Function Mode | |
| --- | --- | --- |
| | First Simulation | Second Simulation |
| First Group | 100.00% | 85.00% |
| Second Group | 95.00% | 75.83% |
| Third Group | 76.67% | 70.00% |

As can be understood from the simulation results, even when only the contact information is used as input information (in the second group), a high success rate is shown. Thus, the present invention can be achieved even when the portable terminal uses only the contact sensing unit 110. However, to improve a success rate of recognizing a function mode, it is desirable to use both contact information and motion information as input information as in the first group.

A success rate of recognizing a function mode increases as the number of data sets used as training sets increases, which means a success rate of recognizing a function mode increases as the number of times a user uses the portable terminal increases, as described using Equations 1 through 6.

The simulation results are examples for explaining a possibility of implementing the present invention, and the present invention is not limited to the simulation results.

As described above, according to the present invention, a function mode of a portable terminal is controlled according to the way a user holds the portable terminal, thereby providing a user with convenience of changing a function mode of the portable terminal through a single manipulation.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic device, comprising:
a memory storing a plurality of recognition models;
a contact sensing unit to sense at least two areas contacted by a user and output contact signals corresponding to the contacted areas; and
at least one processor to identify a contact pattern of the contact signals, to recognize a mode based on the plurality of recognition models corresponding to the identified contact pattern, and to put the electronic device into the recognized mode, to determine if the recognized mode is a desired mode based on information input by the user, and, to update a corresponding recognition model stored in the memory based on a result of the determination.

2. The electronic device of claim 1, wherein the contact sensing unit comprises:
the at least two contact sensors which output the contact signals indicating whether the user contacts the contact sensors; and
a contact signal processor which combines the contact signals output from the contact sensors and generates information about the contact pattern.

3. The electronic device of claim 2, wherein the contact sensors are contact-type sensors that determine a contact has occurred when there is a direct contact by the user or contactless sensors that determine a contact has occurred when the user is within a predetermined distance of the contact sensors without directly contacting the contact sensors.

4. The electronic device of claim 1, further comprising a motion sensing unit which senses a rotation angle of the electronic device with respect to a predetermined reference axis that is preset in the electronic device or an angle of the predetermined reference axis with respect to the gravity direction as the user holds the electronic device, wherein the at least one processor additionally uses information sensed by the motion sensing unit to recognize the mode of the electronic device.

5. The electronic device of claim 4, wherein the motion sensing unit comprises an inertial sensor or an acceleration sensor to sense the motion of the electronic device.

6. The electronic device of claim 1, further comprising an external device sensing unit which senses attachment or detachment of an external device of the electronic device,
wherein the at least one processor additionally uses information sensed by the external device sensing unit as information for recognizing the mode of the electronic device.

7. The electronic device of claim 6, wherein the external device is any of an earphone, a headphone, secure digital (SD) card or multi media card (MMC).

8. The electronic device of claim 1, wherein the mode of the electronic device is any of SMS (Short Message Service) mode, MP3 mode, camera mode, left-hand call mode or right-hand call mode.

9. The electronic device of claim 1, wherein the contact pattern substantially covers at least one specific area on each side of the electronic device.

10. The electronic device of claim 1, wherein the contact sensing unit determines areas not contacted by the user when the user holds the electronic device.

11. The electronic device of claim 1, wherein the contact signals comprise identification information regarding each of specific and discrete areas of the electronic device contacted by the user.

12. The electronic device of claim 1, wherein the contact pattern comprises information about contact state of the contacted areas and contact state of at least one area not contacted by the user.

13. A method for controlling a electronic device, the method comprising:
storing a plurality of recognition models;
sensing at least two areas contacted by a user;
outputting contact signals corresponding to the contacted areas;
identifying a contact pattern of the contact signals;
recognizing a mode based on the plurality of recognition models corresponding to the identified contact pattern;
putting the electronic device into the recognized mode;
determining if the recognized mode is a desired mode based on information input by the user; and
updating a corresponding recognition model based on a result of the determination.

14. The method of claim 13, further comprising
combining the contact signals output from the at least two contact sensors; and
generating information about the contact pattern.

15. The method of claim 14, wherein the at least two contact sensors are contact-type sensors that determine a contact has occurred when there is a direct contact by the user or contactless sensors that determine a contact has occurred when the user is within a predetermined distance of the contact sensors without directly contacting the contact sensors.

16. The method of claim 13, further comprising sensing a rotation angle of the electronic device with respect to a predetermined reference axis that is preset in the electronic device or an angle of the predetermined reference axis with respect to the gravity direction as the user holds the electronic device and additionally using the sensed angle to recognize the mode of the electronic device.

17. The method of claim 13, further comprising sensing attachment or detachment of an external device of the electronic device and additionally using the sensed attachment or detachment to recognize the mode of the electronic device.

18. The method of claim 17, wherein the external device is any of an earphone, a headphone, secure digital (SD) card or multi media card (MMC).

19. The method of claim 13, wherein the mode of the electronic device is any of SMS (Short Message Service) mode, MP3 mode, camera mode, left-hand call mode or right-hand call mode.

20. The method of claim 13, wherein the contact pattern substantially covers at least one specific area exists on each side of the electronic device.

21. The method of claim 13, further comprises determining areas not contacted by the user when the user holds the electronic device.

22. The method of claim 13, wherein the contact signals comprise identification information regarding each of specific and discrete areas of the electronic device contacted by the user.

23. The method of claim 13, wherein the contact pattern comprises information about contact state of the contacted areas and contact state of at least one area not contacted by the user.

* * * * *